United States Patent
McIntyre et al.

(10) Patent No.: US 8,240,735 B2
(45) Date of Patent: Aug. 14, 2012

(54) TAILGATE DAMPING/DETENT SYSTEM

(75) Inventors: Andrew R. McIntyre, Midland (CA); David J Smallwood, Barrie (CA)

(73) Assignee: M & C Corporation, Sterling Heights, MI (US)

( * ) Notice: Subject to any disclaimer, the term of this patent is extended or adjusted under 35 U.S.C. 154(b) by 0 days.

(21) Appl. No.: 12/907,221

(22) Filed: Oct. 19, 2010

(65) Prior Publication Data
US 2011/0089712 A1    Apr. 21, 2011

Related U.S. Application Data

(60) Provisional application No. 61/272,671, filed on Oct. 19, 2009.

(51) Int. Cl.
*B60P 1/267*    (2006.01)
(52) U.S. Cl. .......................................... 296/57.1; 296/50
(58) Field of Classification Search ................. 296/57.1, 296/50
See application file for complete search history.

(56) References Cited

U.S. PATENT DOCUMENTS

| | | | |
|---|---|---|---|
| 7,195,300 B2 | 3/2007 | Austin | |
| 7,213,857 B2 * | 5/2007 | Austin | ........................... 296/50 |

* cited by examiner

*Primary Examiner* — Joseph Pape
(74) *Attorney, Agent, or Firm* — Nixon & Vanderhye, PC

(57) ABSTRACT

A tailgate damping and detent system is disclosed for a vehicle, including a tailgate lift assist system with a torque rod rotationally grounded between the tailgate at a first end and a first side of the vehicle's frame at a second end. "Damping" is achieved by increasing the diameter of the torque rod. The increased torque rod diameter overcompensates for the weight of the tailgate, so that this increased load decelerates the tailgate starting from the neutral balance point to the fully open position. The speed of the tailgate approaches zero at the end of the travel of the tailgate to the fully open position, which greatly reduces the "slam" at the end of travel. The tailgate is held in the open position by a link detent system. There is a slot in the gate side of the link that a spring loaded pin latches into.

19 Claims, 7 Drawing Sheets

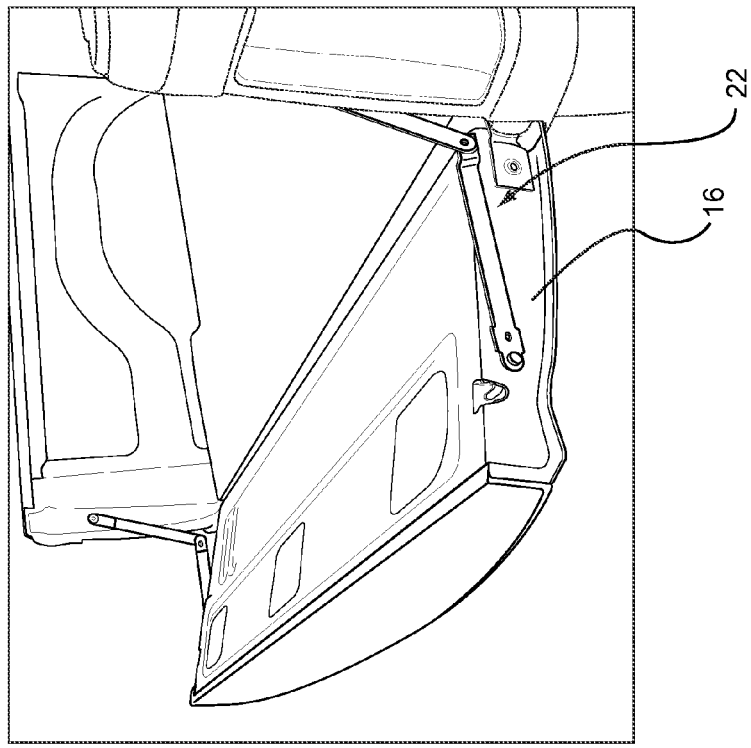
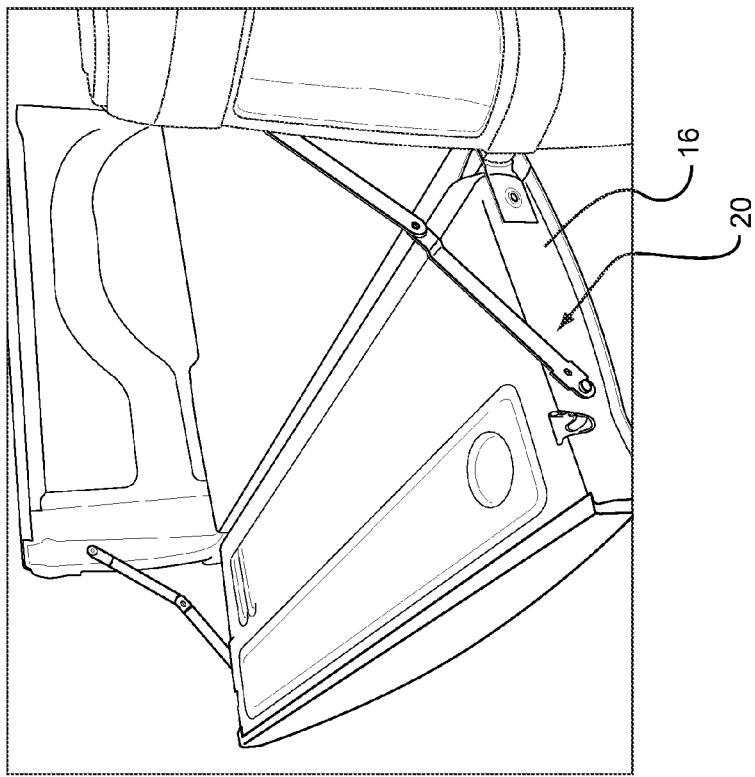
Fig. 3b
Fig. 3a

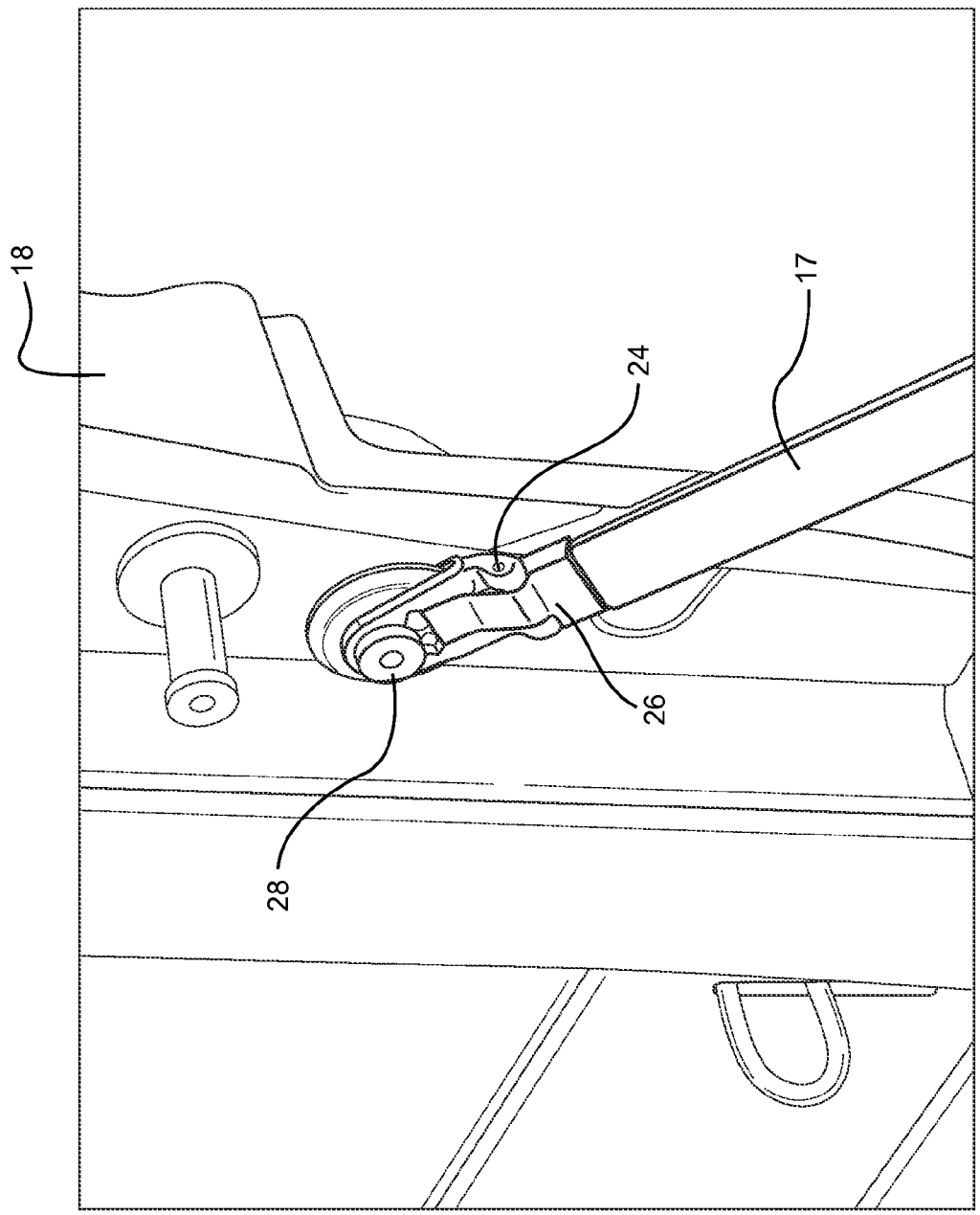

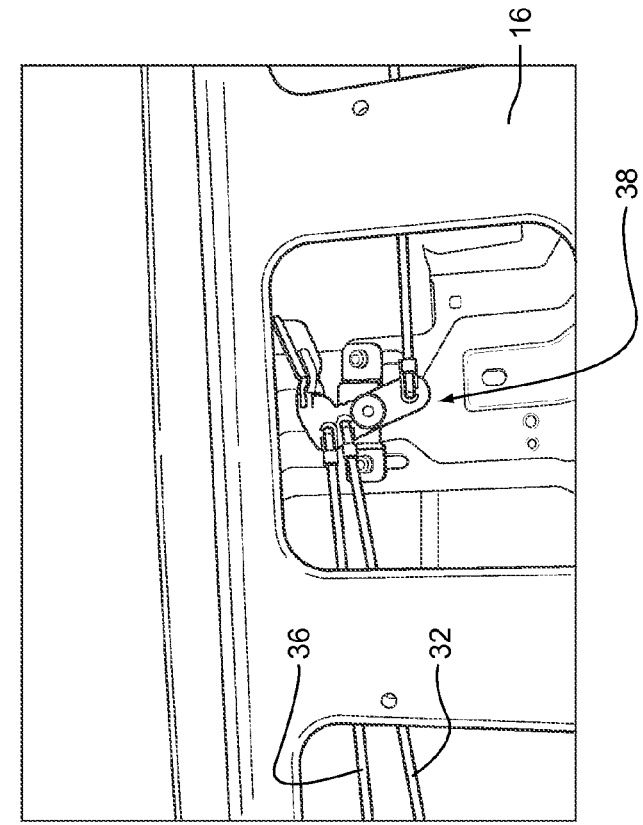
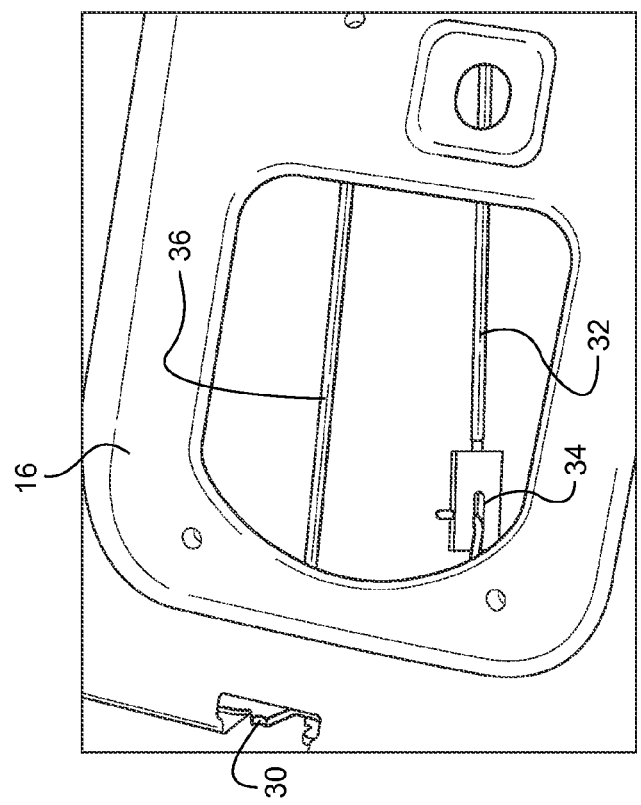
Fig. 5b
Fig. 5a

US 8,240,735 B2

TAILGATE DAMPING/DETENT SYSTEM

This application claims the benefit of U.S. Provisional Application No. 61/272,671, filed Oct. 19, 2009, the entire contents, of which, is incorporated herein by reference.

FIELD OF THE INVENTION

The present invention relates to vehicle tailgate lift assist assemblies, and more particularly to a damping and detent system used with such lift assist assemblies.

BACKGROUND OF THE INVENTION

Vehicle body closure members, such as tailgates, are typically pivotally mounted between body side panels forming the pillars at the rear of the vehicle. The tailgate typically pivots about a hinge axis between a horizontal, open position and a vertical, closed position. Some tailgate mounting assemblies include a counterbalancing hinge assembly for assisting movement of the tailgate and counterbalancing the weight of the tailgate during opening and closing movements.

The tailgate counterbalancing hinge assembly often includes a torque rod that is grounded on one end to the vehicle's tailgate and on the other end to the vehicle so that the torque rod is twisted as the tailgate is moved between open and closed positions.

Although torque rod based tailgate counter balancing hinge designs reduce the effort required to raise and lower a tailgate by storing energy in the twisting of the torque rod during opening/lowering of the tailgate, because of the residual kinetic energy stored in the tailgate, the tailgate, when free falling, can cause objectionable impact on the supports straps or on a vehicle operator. Indeed, because a tailgate can be heavy and hard to lift when being closed, it can drop down quickly when being opened, and thus cause injury to a vehicle operator. The present invention solves these problems by de-accelerating the tailgate and having it come to a gradual stop at the open position, reducing possibility of operator injury or the gate crashing down on check straps that may be mounted to the vehicle box and that keep the tailgate from over traveling.

BRIEF DESCRIPTION OF THE INVENTION

A tailgate damping and detent system is disclosed for a vehicle, including a tailgate lift assist system with a torque rod rotationally grounded between the tailgate at a first end and a first side of the vehicle's frame at a second end. A conventional tailgate counterbalance system is disclosed in U.S. Pat. No. 7,195,300, the entire contends of which are incorporated herein by reference.

"Damping" of the opening tailgate is achieved by increasing the diameter of the torque rod. The increased torque rod diameter overcompensates for the weight of the tailgate so that the neutral "balance" point of the tailgate occurs at a point between the vertical, fully closed position and the horizontal, fully open position of the tailgate. This increased load decelerates the tailgate starting from the neutral balance point to the fully open position. The speed of the tailgate approaches zero at the end of the travel of the tailgate to the fully open position, which greatly reduces the "slam" at the end of travel.

The tailgate is then held in the open position by a link detent system. A spring loaded pin latches into a slot in the gate side of a link that is part of the link detent system. The pin can be actuated by the handle to release the detent, or can be overpowered without releasing the detent.

BRIEF DESCRIPTION OF THE DRAWINGS

FIG. 3a is a perspective view of a tailgate held in its horizontal, fully open position by the link system and the detent locks used with the present invention.

FIG. 3b is a perspective view of a tailgate using the damping and detent system that is in its released, neutral position between its horizontal, fully open position and its vertical, fully closed position.

FIG. 4 is a perspective view of one of the links of the link system attached to a truck body by a spring clip.

FIG. 5a is a top view of a cut-out in a tailgate showing lock rods used with a tailgate handle/bell crank and with the detent system of the present invention.

FIG. 5b is a second top view of a second cut-out in a tailgate, again showing the lock rods used with a tailgate handle/bell crank and with the detent system of the present invention.

DETAILED DESCRIPTION OF THE INVENTION

Figure 1A:
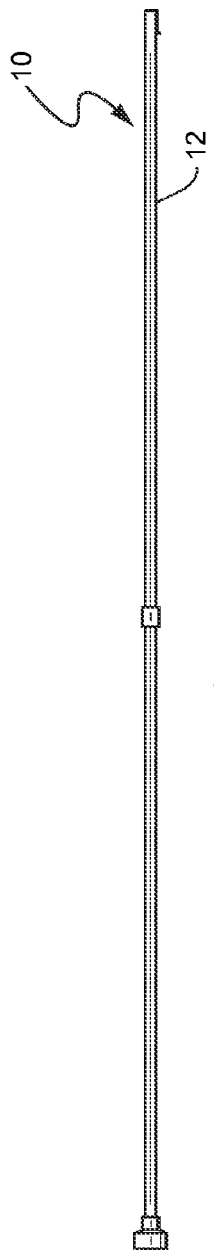
FIG. 1a is a side view of a torsion rod used in the tailgate damping and detent system of the present invention.
Figure 1C:
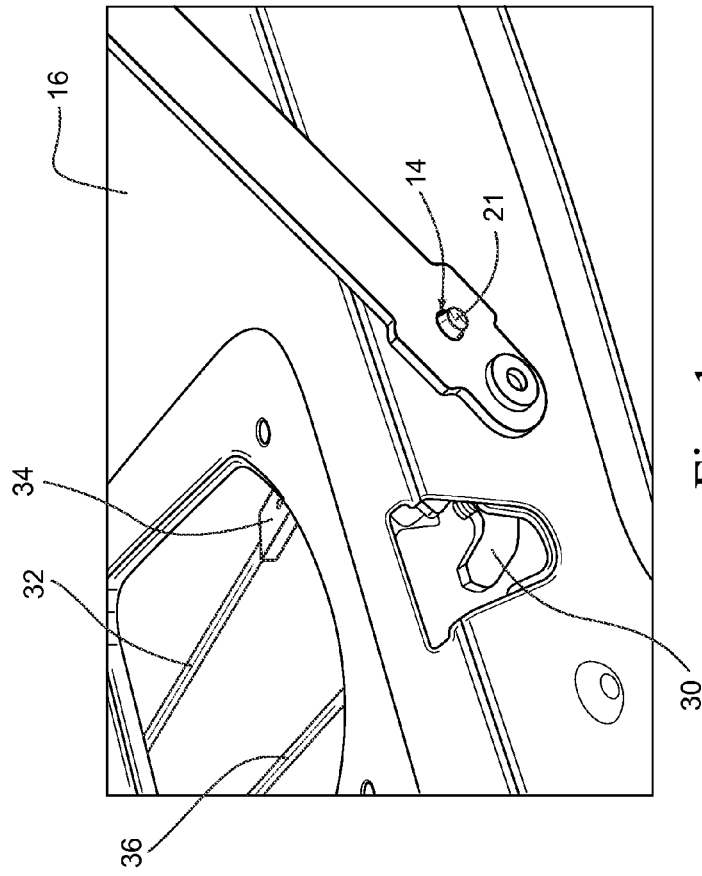
FIG. 1c is a perspective view of a detent lock used by the tailgate damping and detent system to hold the tailgate in its horizontal, fully open position.
Figure 1B:
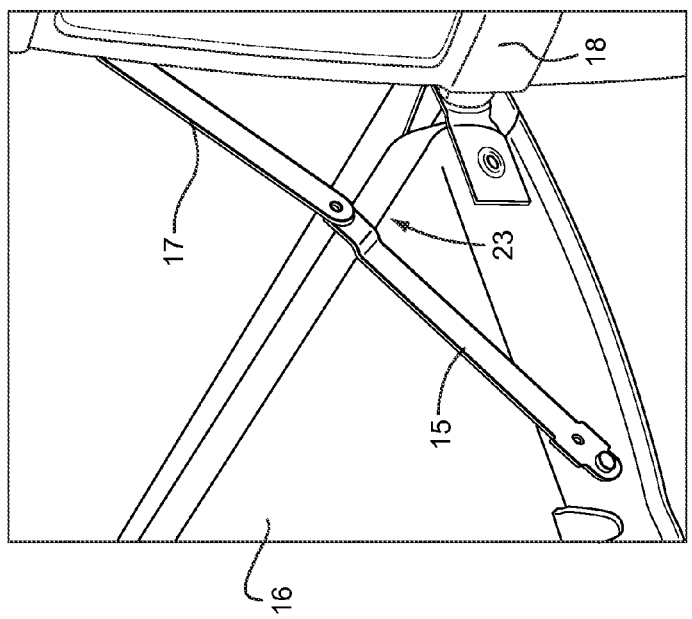
FIG. 1b is a perspective view of a link system that is used to support a tailgate in its horizontal, fully open position.
Figure 6:
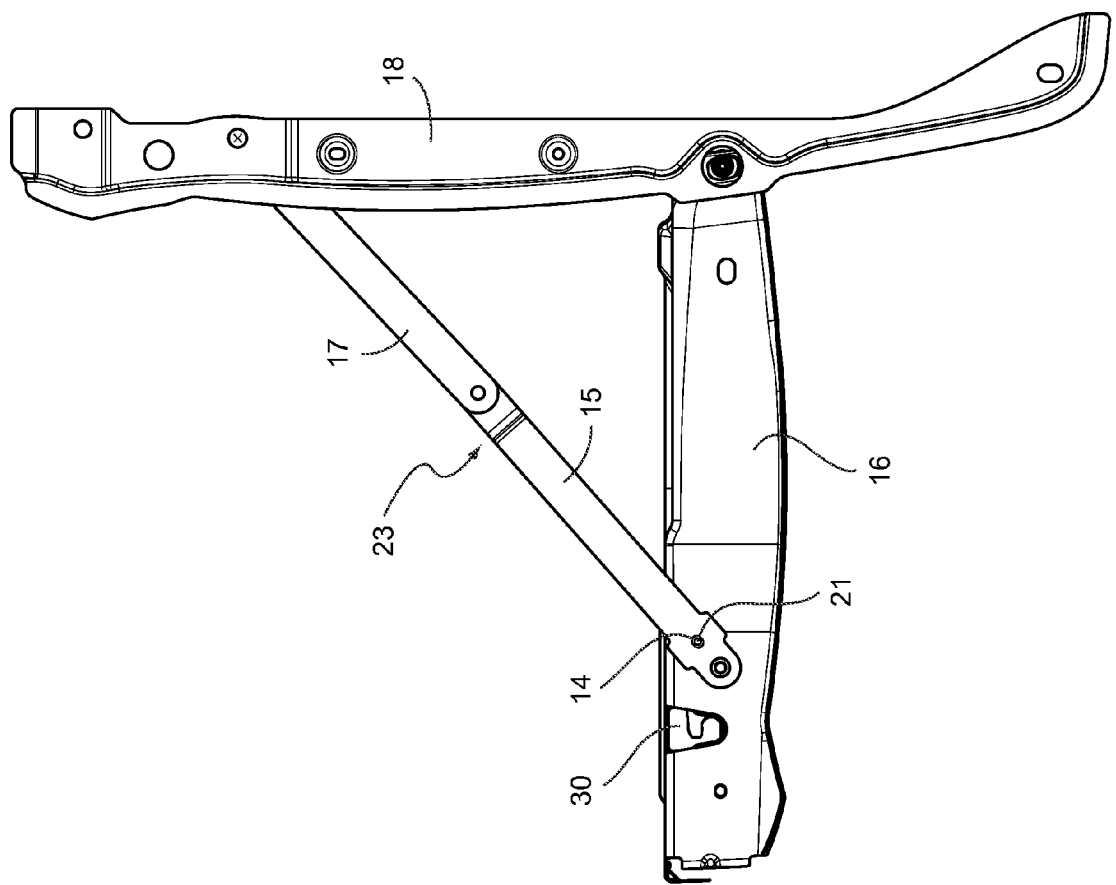
FIG. 6 is a side elevational view showing a tailgate held in its horizontal, fully open position by the link system and detent locks used in the present invention.
Figure 7:
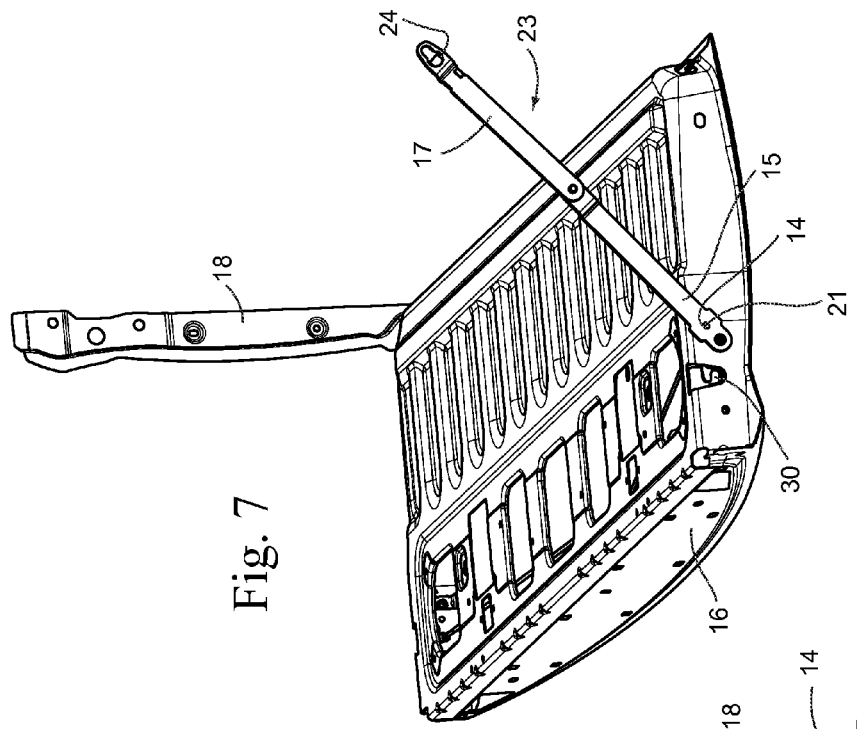
FIG. 7 is a side perspective view showing a tailgate held in its horizontal, fully open position by the link system and detent locks used in the present invention.

FIGS. 1a through 1c show the several components comprising the tailgate damping and detent system 10 of the present invention. FIG. 6 is a side elevational view showing the several components of the tailgate damping and detent system 10, while FIG. 7 is a perspective view, also showing the several components of the tailgate damping and detent system 10.

FIG. 1a shows a torque rod 12 that would be found in a conventional tailgate counterbalance system, except that the torque rod is formed with an increased diameter to overcompensate for the weight of the tailgate 16 that it is used to counterbalance.

FIG. 1b shows a link system 23 that replaces the cables that are typically used to assist in supporting a tailgate 16 that is attached to a vehicle 18. The link system 23 includes a lower link 15 that is pivotally attached to the tailgate 16 and an upper link 17 that is pivotally attached to the body of a vehicle 18. Upper and lower links 15 and 17 are then pivotally attached to one another.

FIG. 1c shows a detent lock that is used to hold a tailgate 16 that includes the tailgate damping and detent system 10 in its horizontal, fully open position. The detent lock includes a slot 14 in the lower link 15 which engages a tapered or beveled pin 21, shown in FIG. 8b, that is spring loaded so as to be caused to protrude from the. side of the tailgate 16 to engage the slot 14.

Figure 2:
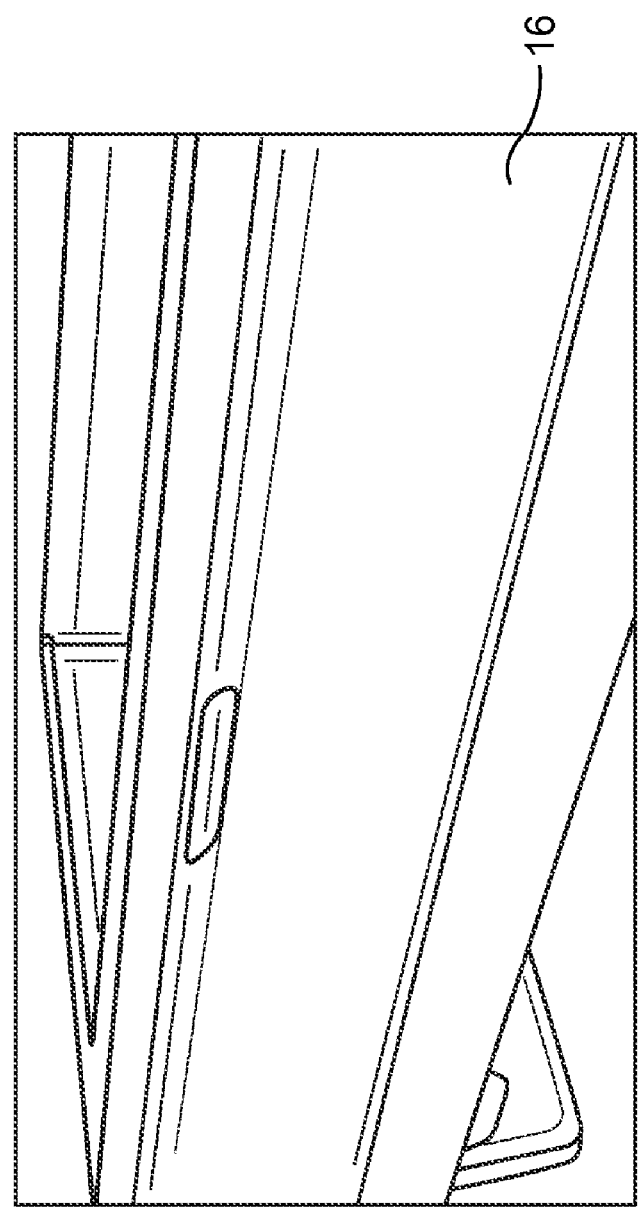
FIG. 2 is a drawing depicting a mock-up of a tailgate in a closed position.

FIG. 2 is a drawing depicting a mock-up of a tailgate 16 in its vertical, closed position and includes bullets of the features of the tailgate damping and detent system 10 of the present invention. Because the diameter of the torque rod 12 is increased to overcompensate for the weight of the tailgate 16, the increased load of the torque rod 12 tends to decelerate the tailgate 16 starting from a neutral balance point to the horizontal, fully open position of the tailgate 16. The speed of the tailgate 16 approaches zero at the end of the tailgate's travel, which greatly reduces the "slam" at the end of the travel. To hold the tailgate 16 in its open position and to prevent the torque rod from moving the tailgate to its neutral position, the system 10 of the present invention includes a tailgate lockdown feature that is achieved using the link system 23 and the detent lock shown in FIG. 1c.

When tailgate 16 is pivoted to its vertical, closed position, or its horizontal, open position, torque rod 12 is subjected to torsion, which is the twisting (shear stress) of torque rod 12 about its axis by torque applied at its ends. The magnitude of torque τ depends on the force F applied, the length r of a lever arm or the like connecting the axis of torque rod 12 to the point of force application, and the angle θ between the two. This torque can be expressed as follows:

$$\tau = rF \sin \theta$$

Because the ends of torque rod 12 are connected between one side of tailgate 16 and an opposite side of a truck body 18 on which tailgate 16 is pivotally mounted, the torque is applied to torque rod 12 as tailgate 16 is pivoted. When the tailgate 16 is opened so as to be pivoted down from its vertical, closed position, towards its horizontal, open position, the twisting of the torque rod 12 is reduced until tailgate 16 reaches a neutral position in which it is positioned between its vertical, closed position and its horizontal, open position. As the tailgate 16 is opened further so as to be pivoted completely down to its horizontal, open position, the torque rod 12 is again subjected to torsion resulting from the twisting of the torque rod 12 in an opposite direction resulting from the tailgate 16 being completely opened. As the tailgate 16 is rotated past its neutral position, the twisted torque rod 12 begins to exert a force on the tailgate 16 that counters those forces acting on the tailgate 16 resulting from the tailgate 16 being actively opened by a vehicle operator and gravity acting upon the tailgate as it is rotated to its open, horizontal position. The force from gravity acting upon the tailgate as it is rotated open is related to the weight of the tailgate.

In the tailgate damping and detent system 10, the diameter of the torque rod 12 is increased so that as it is twisted by the opening of tailgate 16, it produces a torque, that in turn, exerts a counter-force that is greater than the force from gravity acting upon the tailgate as it is rotated open, to thereby overcompensate for the weight of the tailgate 16, such that the force from the torque rod 12 tends to decelerate the tailgate 16 starting from the tailgate's neutral balance point to the tailgate's horizontal, fully open position. This torque can be expressed as follows:

$$T = \theta J G / L$$

where
T is the torque,
θ is the windup angle of the torque rod.
J is the polar moment of inertia
G is the modulus of rigidity
L is the effective length of the torque rod Stated differently, the diameter that will be selected for torque rod 12 will be at least partially dependent upon the weight of tailgate 16 so that a counter-force can be developed to overcome the force of gravity on the tailgate, whereby the increased torque rod diameter overcompensates for the weight of the tailgate so that the neutral "balance" point of the tailgate occurs at a point between the vertical, fully closed position and the horizontal, fully open position of the tailgate. FIG. 3a shows the tailgate 16 locked in its open position 20. FIG. 3b shows the tailgate 16 in its neutral position 22 between its open position 20 and its closed position shown in FIG. 2.

FIG. 4 is a perspective view of one of the links 17 of the link system 23 used in the present invention. As shown in FIG. 4, the upper link 17 is rotatably attached to a truck body 18 at its end 24 by a slot in end 24 being fitted over a fastener 28 attached to the truck body 18. The end 24 is then held in place by a spring clip 26, which is fitted over the end 24 of upper link 17.

FIGS. 5a and 5b are top views of cut-outs in tailgate 16 showing lock rods 32 and 36 attached to a handle/bell crank 38 that is used to open tailgate 16 when it is in its closed, vertical position. A first lock rod 36 is attached between the bell crank 38 and the release latch 30 located at the side of tailgate 16 and engaging a pin protruding from the side wall 18 of a truck. The other lock rod 32 is also attached to the bell crank 38 at one end and then attached to an adjusting mechanism 34, which, in turn, is attached to a second portion 33 of the lock rod 32. The second portion 33 of the lock rod is attached to a tapered or beveled pin 21 that is slidably mounted within a cylinder 19 that is mounted on an inside side wall of the tailgate 16.

Figure 8A:
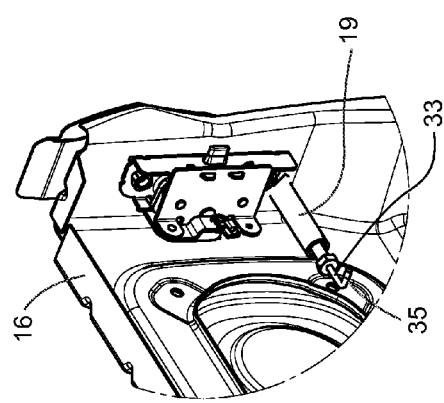
FIG. 8a is a perspective view of the interior of a tailgate showing a cylinder in which is mounted a tapered pin that engages a lower link of the link system to form the detent lock to hold a tailgate in its horizontal, fully open position.
Figure 8B:
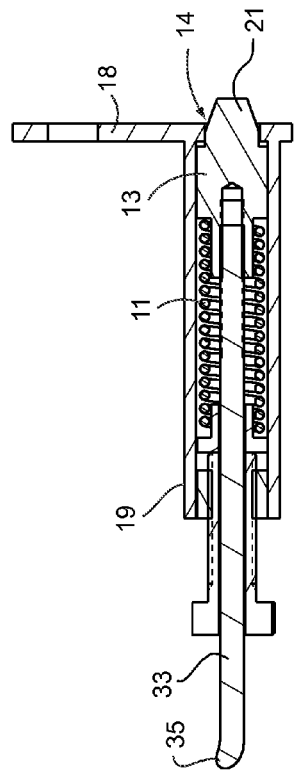
FIG. 8b is a side cross-sectional view showing the components of the cylinder in which is mounted the tapered pin that engages the lower link of a link system to form a detent lock to hold a tailgate in its horizontal, fully open position.

The mounting arrangement of the cylinder 19 is shown in FIG. 8a. The components of the cylinder 19 are shown in FIG. 8b. The second portion 33 of the lock rod 32 includes a bent end 35 which is hooked into the adjusting mechanism 34. The degree to which the pin 21 protrudes from the side of the tailgate 16 is adjusted by sliding the adjusting mechanism 34 along the first portion of the lock rod 32 and then holding the adjusting mechanism 34 in place on the lock rod 32 by means of a locking screw engaging the lock rod 32.

The pin 21 includes a shoulder 13 which slidably engages the interior of cylinder 19. Surrounding a portion of the second portion 33 is a coil spring 11 that butts against shoulder 13. The spring 11 is compressed when the pin 21 is caused to be retracted out of detent lock slot 14, either by the movement of the handle/bell crank 38 or when the adjustment mechanism 34 is moved toward the bell crank 38 to cause the pin 21 to be retracted out of the slot 14. The pin 21 can be actuated by the handle of the bell crank 38 to release the detent slot 14 by pin 21 being retracted, or the pin 21 can be overpowered without releasing the detent by moving the tailgate out of its closed position. In this latter instance, the spring 11 is again compressed when the pin 21 is caused to be retracted out of detent lock slot 14 by movement of the tailgate 16.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:
1. A vehicle body closure member damping and detent system comprising:

a closure member lift assist system with a torque rod rotationally grounded between a side of the closure member and a side of the vehicle's body, the torque rod having a diameter that is selected so that the torque rod produces a torque to counteract a weight of the closure member so that a neutral balance point of the closure member occurs at a point between a vertical, fully closed position of the closure member and a horizontal, fully open position of the closure member, and a link detent system that engages the closure member so as to hold the closure member in the horizontal, fully open position.

2. The system of claim 1, wherein the link detent system comprises a lower link that is pivotally attached to the closure member and an upper link that is pivotally attached to the vehicle body, the upper and lower links also being pivotally attached to one another.

3. The system of claim 2, wherein the link detent system further comprises a detent lock that includes a retractable pin protruding from a side of the closure member and a lock slot in the lower link that engages the pin.

4. The system of claim 3, wherein the pin is spring loaded so as to protrude from the side of the closure member to engage the slot in the lower link when the closure member is pivoted to the horizontal, fully open position of the closure member.

5. The system of claim 1, wherein the selected diameter of the torque rod is such that the torque rod, when twisted with the opening of the closure member, produces a torque, that in turn, exerts a counter-force to a force from gravity acting upon the closure member to thereby counteracts the weight of the closure member and decelerate the closure member starting from the neutral balance point of the closure member to the fully open position of the closure member.

6. The system of claim 5, wherein the selected diameter of the torque rod is such that the counter-force exerted on the closure member causes a speed of the closure member resulting from the gravity force acting upon the closure member as to is opened to approach zero at the end of the travel of the closure member to the closure member's fully open position.

7. The system of claim 2 further comprising a fastener attached to the vehicle's body, wherein an end of the upper link is pivotally attached to the vehicle body by a slot in the attached end of the upper link being fitted over the fastener attached to the vehicle's body, and wherein the attached end of the upper link is held in place with respect to the fastener by a spring clip, which is fitted over the attached end of the upper link.

8. The system of claim 3, wherein the link detent system further comprises a lock rod attached between a handle/bell crank that is used to open the closure member when it is in its closed, vertical position and the retractable pin protruding from the side wall of the closure member.

9. The system of claim 8, wherein a first portion of the lock rod is attached to the bell crank at one end and then attached to an adjusting mechanism at a second end, and wherein the adjusting mechanism is attached to a second portion of the lock rod which is attached to the pin.

10. The system of claim 3, wherein the pin is slidably mounted within a cylinder that is mounted on an inside side wall of the closure member, the pin includes a shoulder which slidably engages the interior of the cylinder, and the cylinder includes a coil spring that butts against the shoulder and that surrounds a portion of the second portion of the lock rod, whereby the spring is compressed when the pin is caused to be retracted out of the detent lock slot by movement of the handle/bell crank or by movement of the closure member out of its closed position.

11. The system of claim 9, wherein the second portion of the lock rod is connected to the adjusting mechanism, and wherein the degree to which the pin protrudes from the side of the closure member is adjusted by positioning the adjusting mechanism along the first portion of the lock rod and then locking the adjusting mechanism in place on the lock rod.

12. The system of claim 3, wherein the pin is tapered or beveled.

13. A vehicle tailgate damping and detent system comprising:

a tailgate lift assist system with a torque rod rotationally grounded between a side of the tailgate at a first end and a first side of the vehicle's body at a second end, the torque rod having a diameter that is selected so that the torque rod produces a torque to counteract the weight of the tailgate so that a neutral balance point of the tailgate occurs at a point between a vertical, fully closed position of the tailgate and a horizontal, fully open position of the tailgate, and a link detent system that engages the tailgate so as to hold the tailgate in the horizontal, fully open position, the link detent system comprising:

a lower link that is pivotally attached to the tailgate and an upper link that is pivotally attached to the vehicle's body, the upper and lower links also being pivotally attached to one another, and a detent lock that includes a retractable beveled pin protruding from a side of the tailgate and a detent lock slot in the lower link that engages the beveled pin.

14. The system of claim 13, wherein the selected diameter of the torque rod is such that the torque rod, when twisted with the opening of the tailgate, produces a torque, that, in turn, exerts a counter-force to a force from gravity acting upon the tailgate to thereby counteracts the weight of the tailgate and decelerate the tailgate starting from the neutral balance point of the tailgate to the fully open position of the tailgate.

15. The system of claim 13, wherein the selected diameter of the torque rod is such that the counter-force exerted on the tailgate causes a speed of the tailgate resulting from the gravity force acting upon the tailgate as it is opened to approach zero at the end of the travel of the tailgate to the tailgate's fully open position.

16. The system of claim 13, wherein the link detent system further comprises a lock rod attached between a handle/bell crank that is used to open the tailgate when it is in its closed, vertical position and the retractable pin protruding from the side wall of the tailgate.

17. The system of claim 13, wherein the pin is slidably mounted within a cylinder that is mounted on an inside side wall of the tailgate, the pin includes a shoulder which slidably engages the interior of the cylinder, and the cylinder includes a coil spring that butts against the shoulder and that surrounds a portion of the second portion of the lock rod, whereby the spring is compressed when the pin is caused to be retracted out of the detent lock slot by movement of the handle/bell crank or by movement of the tailgate out of its closed position.

18. The system of claim 16, wherein a first portion of the lock rod is attached to the bell crank at one end and then attached to an adjusting mechanism at a second end, and wherein the adjusting mechanism is attached to a second portion of the lock rod which is attached to the pin.

19. The system of claim 18, wherein the second portion of the lock rod includes a bent end which is hooked into the adjusting mechanism, and wherein the degree to which the pin protrudes from the side of the tailgate is adjusted by sliding the adjusting mechanism along the first portion of the lock rod and then holding the adjusting mechanism in place on the lock rod by means of a locking screw engaging the lock rod.

* * * * *